United States Patent
Du et al.

(10) Patent No.: US 10,503,170 B2
(45) Date of Patent: Dec. 10, 2019

(54) METHOD AND APPARATUS FOR MONITORING AN AUTONOMOUS VEHICLE

(71) Applicant: GM GLOBAL TECHNOLOGY OPERATIONS LLC, Detroit, MI (US)

(72) Inventors: Xinyu Du, Oakland Township, MI (US); Wen-Chiao Lin, Rochester Hills, MI (US); Shengbing Jiang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 208 days.

(21) Appl. No.: 15/688,460

(22) Filed: Aug. 28, 2017

(65) Prior Publication Data
US 2019/0064811 A1    Feb. 28, 2019

(51) Int. Cl.
*G05D 1/00* (2006.01)
*G08G 1/16* (2006.01)
*G01S 13/86* (2006.01)
*G07C 5/00* (2006.01)
*G01S 13/93* (2006.01)

(52) U.S. Cl.
CPC .......... *G05D 1/0088* (2013.01); *G01S 13/867* (2013.01); *G08G 1/161* (2013.01); *G01S 2013/935* (2013.01); *G01S 2013/9342* (2013.01); *G01S 2013/9346* (2013.01); *G05D 2201/0213* (2013.01); *G07C 5/00* (2013.01)

(58) Field of Classification Search
USPC .......................................................... 701/23
See application file for complete search history.

(56) References Cited

U.S. PATENT DOCUMENTS

| | | | | |
|---|---|---|---|---|
| 2010/0174514 | A1* | 7/2010 | Melkumyan | G06F 17/18 703/2 |
| 2012/0179635 | A1* | 7/2012 | Vasudevan | G06F 17/18 706/12 |
| 2013/0249909 | A1* | 9/2013 | Thompson | G06T 17/05 345/420 |
| 2016/0370177 | A1* | 12/2016 | Laine | G01D 5/268 |
| 2017/0139411 | A1* | 5/2017 | Hartung | H04L 12/40 |
| 2017/0343665 | A1* | 11/2017 | Willey | G01S 13/003 |

* cited by examiner

*Primary Examiner* — Tyler D Paige
(74) *Attorney, Agent, or Firm* — Quinn IP Law (57) ABSTRACT

An autonomic vehicle control system includes a vehicle spatial monitoring system including a plurality of spatial sensors disposed to monitor a spatial environment proximal to the autonomous vehicle. A controller is in communication with the spatial sensors of the vehicle spatial monitoring system, and the controller includes a processor and a memory device including an instruction set. The instruction set is executable to generate a perception result associated with a static field of view for each of the spatial sensors, wherein each of the spatial sensors is positioned at an analogous orientation to generate the respective perception result associated with the static field of view. The perception results from the plurality of spatial sensors are compared to detect a fault associated with one of the spatial sensors.

17 Claims, 5 Drawing Sheets

METHOD AND APPARATUS FOR MONITORING AN AUTONOMOUS VEHICLE

INTRODUCTION

Autonomous vehicles can include on-board monitoring systems to detect occurrence of a fault or another indication of a need for service and/or vehicle maintenance.

SUMMARY

An autonomic vehicle control system is described, and includes a vehicle spatial monitoring system including a plurality of spatial sensors disposed to monitor a spatial environment proximal to the autonomous vehicle. A controller is in communication with the spatial sensors of the vehicle spatial monitoring system, and the controller includes a processor and a memory device including an instruction set. The instruction set is executable to generate a perception result associated with a static field of view for each of the spatial sensors, wherein each of the spatial sensors is positioned at an analogous orientation to generate the respective perception result associated with the static field of view. The perception results from the plurality of spatial sensors are compared to detect a fault associated with one of the spatial sensors.

An aspect of the disclosure includes the spatial sensors being sequentially positioned at the analogous orientation to generate the respective perception result associated with the static field of view.

Another aspect of the disclosure includes a controllable headlamp, wherein the instruction set is executable to generate a first perception result for one of the spatial sensors in an environment lacking in ambient light, illuminate the headlamp and generate a second perception result for the spatial sensor, compare the first perception result and the second perception result, and detect a fault associated with the spatial sensor based upon the comparison.

Another aspect of the disclosure includes a plurality of vehicle dynamic sensors disposed to monitor a vehicle chassis and powertrain, wherein the instruction set is further executable to control the autonomous vehicle to execute a driving maneuver, monitor the vehicle dynamic sensors and coincidently monitor one of the spatial sensors. The signal outputs from the vehicle dynamic sensors and a signal output from the spatial sensor are compared to detect a fault associated with the spatial sensor.

Another aspect of the disclosure includes the instruction set being further executable to identify one of the spatial sensors having a fault associated therewith, determine a field of view associated with the one of the spatial sensors having the fault, and adjust positions of the remaining ones of the spatial sensors to include the field of view associated with the one of the spatial sensors having the fault.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
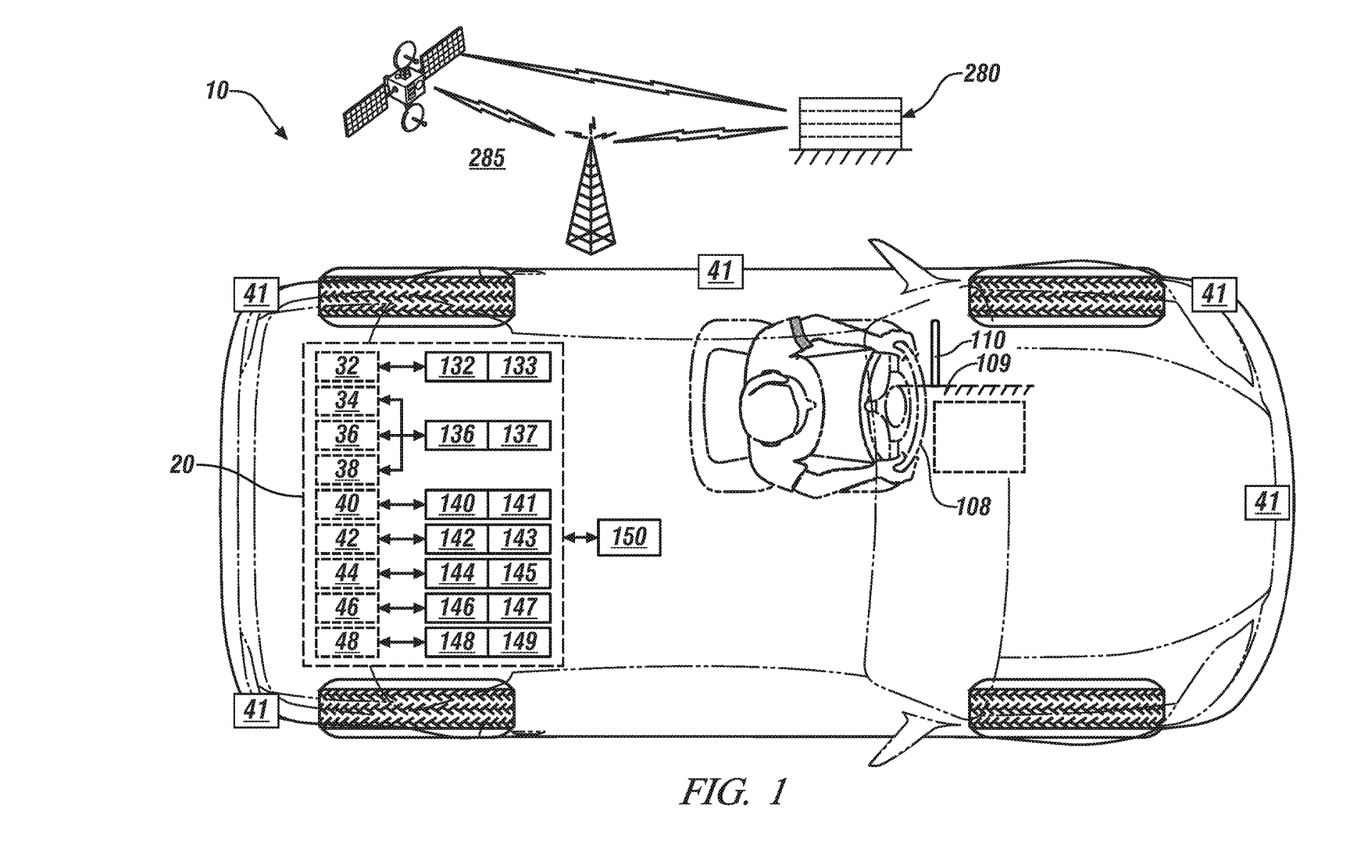
FIG. 1 schematically shows a vehicle including an autonomic vehicle control system and associated controllers, in accordance with the disclosure.

Referring to the drawings, wherein like reference numerals correspond to like or similar components throughout the several Figures, FIG. 1, consistent with embodiments disclosed herein, illustrates a vehicle 10 that includes an autonomic vehicle control system 20 and an associated vehicle health monitoring (VHM) controller 150 that is illustrative of the concepts described herein. The vehicle 10 includes, in one embodiment, a four-wheel passenger vehicle with steerable front wheels and fixed rear wheels. The vehicle 10 may include, by way of non-limiting examples, a passenger vehicle, a light-duty or heavy-duty truck, a utility vehicle, an agricultural vehicle, an industrial/warehouse vehicle, or a recreational off-road vehicle.

As employed herein, the autonomic vehicle control system 20 includes an on-vehicle control system that is capable of providing a level of driving automation. The terms 'driver' and 'operator' describe the person responsible for directing operation of the vehicle, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle. Driving automation can include some level of automatic control or intervention related to simultaneous control of multiple vehicle functions, such as steering, acceleration, and/or braking, with the driver continuously having overall control of the vehicle. Driving automation can include simultaneous automatic control of all vehicle driving functions, including steering, acceleration, and braking, wherein the driver cedes control of the vehicle for a period of time during a trip. Driving automation can include simultaneous automatic control of all vehicle driving functions, including steering, acceleration, and braking, wherein the driver cedes control of the vehicle for an entire trip. Driving automation includes hardware and controllers configured to monitor the spatial environment under various driving modes to perform various driving tasks during dynamic operation. Driving automation can include, by way of non-limiting examples, cruise control, adaptive cruise control, lane-change warning, intervention and control, automatic parking, acceleration, braking, and the like.

The autonomic vehicle control system 20 preferably includes one or a plurality of vehicle systems and associated controllers that provide a level of driving automation, and the VHM controller 150 is disposed to monitor, prognosticate and/or diagnose operation of the autonomic vehicle control system 20. The vehicle systems, subsystems and controllers associated with the autonomic vehicle control system 20 are implemented to execute one or a plurality of operations associated with autonomous vehicle functions, including, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. The vehicle systems and associated controllers of the autonomic vehicle control system 20 can include, by way of non-limiting examples, a drivetrain 32 and drivetrain controller (PCM) 132; a steering system 34, a braking system 36 and a chassis system 38, which are controlled by a vehicle controller (VCM) 136; a vehicle spatial monitoring system 40 and spatial monitoring controller 140, a human-machine interface (HMI) system 42 and HMI controller 142; an HVAC system 44 and associated HVAC controller 144; operator controls 46 and an associated operator controller 146; and a vehicle lighting, illumination and external signaling system 48 and associated controller 148.

Each of the vehicle systems and associated controllers may further include one or more subsystems and an associated controller. The subsystems and controllers are shown as discrete elements for ease of description. The foregoing classification of the subsystems is provided for purposes of describing one embodiment, and is illustrative. Other configurations may be considered within the scope of this disclosure. It should be appreciated that the functions described and performed by the discrete elements may be executed using one or more devices that may include algorithmic code, calibrations, hardware, application-specific integrated circuitry (ASIC), and/or off-board or cloud-based computing systems. Each of the aforementioned controllers includes a VHM agent, which can be implemented and executed as algorithmic code, calibrations, hardware, application-specific integrated circuitry (ASIC), or other elements. Each of the VHM agents is configured to perform component and sub-system monitoring, feature extraction, data filtering and data recording for the associated controller. The data recording can include periodic and/or event-based data recording, single time-point data recording and/or consecutive time-point data recording for certain time duration, such as before and/or after the trigger of an event. Such data recording can be accomplished employing circular memory buffers or another suitable memory device.

The PCM 132 communicates with and is operatively connected to the drivetrain 32, and executes control routines to control operation of an engine and/or other torque machines, a transmission and a driveline, none of which are shown, to transmit tractive torque to the vehicle wheels in response to driver inputs, external conditions, and vehicle operating conditions. The PCM 132 is shown as a single controller, but can include a plurality of controller devices operative to control various powertrain actuators, including the engine, transmission, torque machines, wheel motors, and other elements of the drivetrain 32, none of which are shown. By way of a non-limiting example, the drivetrain 32 can include an internal combustion engine and transmission, with an associated engine controller and transmission controller. Furthermore, the internal combustion engine may include a plurality of discrete subsystems with individual controllers, including, e.g., an electronic throttle device and controller, fuel injectors and controller, etc. The drivetrain 32 may also be composed of an electrically-powered motor/generator with an associated power inverter module and inverter controller. The control routines of the PCM 132 may also include an adaptive cruise control system (ACC) that controls vehicle speed, acceleration and braking in response to driver inputs and/or autonomous vehicle control inputs. The PCM 132 also includes a PCM VHM agent 133.

The VCM 136 communicates with and is operatively connected to a plurality of vehicle operating systems and executes control routines to control operation thereof. The vehicle operating systems can include braking, stability control, and steering, which can be controlled by actuators associated with the braking system 36, the chassis system 38 and the steering system 34, respectively, which are controlled by the VCM 136. The VCM 136 is shown as a single controller, but can include a plurality of controller devices operative to monitor systems and control various vehicle actuators. The VCM 136 also includes a VCM VHM agent 137.

The steering system 34 is configured to control vehicle lateral motion. The steering system 34 can include an electrical power steering system (EPS) coupled with an active front steering system to augment or supplant operator input through a steering wheel 108 by controlling steering angle of the steerable wheels of the vehicle 10 during execution of an autonomic maneuver such as a lane change maneuver or another autonomic maneuver that includes a change in one or more of vehicle speed, i.e., acceleration or deceleration, and a change in direction of travel. An exemplary active front steering system permits primary steering operation by the vehicle driver including augmenting steering wheel angle control to achieve a desired steering angle and/or vehicle yaw angle. Alternatively or in addition, the active front steering system can provide complete autonomous control of the vehicle steering function. It is appreciated that the systems described herein are applicable with modifications to vehicle steering control systems such as electrical power steering, four/rear wheel steering systems, and direct yaw control systems that control traction of each wheel to generate a yaw motion.

The braking system 36 is configured to control vehicle braking, and includes wheel brake devices, e.g., disc-brake elements, calipers, master cylinders, and a braking actuator, e.g., a pedal. Wheel speed sensors monitor individual wheel speeds, and a braking controller can be mechanized to include anti-lock braking functionality.

The chassis system 38 preferably includes a plurality of on-board sensing systems and devices for monitoring vehicle operation to determine vehicle motion states, and, in one embodiment, a plurality of devices for dynamically controlling a vehicle suspension. The vehicle motion states preferably include, e.g., vehicle speed, steering angle of the steerable front wheels, and yaw rate. The on-board sensing systems and devices include inertial sensors, such as rate gyros and accelerometers. The chassis system 38 estimates the vehicle motion states, such as longitudinal speed, yaw-rate and lateral speed, and estimates lateral offset and heading angle of the vehicle 10. The measured yaw rate is combined with steering angle measurements to estimate the vehicle state of lateral speed. The longitudinal speed may be determined based upon signal inputs from wheel speed sensors arranged to monitor each of the front wheels and rear wheels. Signals associated with the vehicle motion states that can be communicated to and monitored by other vehicle control systems for vehicle control and operation.

The vehicle spatial monitoring system 40 and spatial monitoring controller 140 can include a controller that communicates with a plurality of spatial sensors 41 to monitor fields of view proximal to the vehicle 10 and generate digital representations of the fields of view including proximate remote objects. The spatial monitoring controller 140 also includes a spatial monitoring VHM agent 141. The spatial monitoring controller 140 can evaluate inputs from the spatial sensors 41 to determine a linear range, relative speed, and trajectory of the vehicle 10 in view of each proximate remote object. The spatial sensors 41 can be located at various locations on the vehicle 10, including the front corners, rear corners, rear sides and mid-sides. The spatial sensors 41 can include a front radar sensor and a camera in one embodiment, although the disclosure is not so limited. Placement of the aforementioned spatial sensors 41 permits the spatial monitoring controller 140 to monitor traffic flow including proximate vehicles and other objects around the vehicle 10. Data generated by the spatial monitoring controller 140 may be employed by a lane mark detection processor (not shown) to estimate the roadway. The spatial sensors 41 of the vehicle spatial monitoring system 40 can further include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors that utilize digital photographic methods to 'view' forward objects including one or more vehicle(s). Such sensing systems are employed for detecting and locating objects in automotive applications and are useable with systems including, e.g., adaptive cruise control, autonomous braking, autonomous steering and side-object detection.

The spatial sensors 41 associated with the vehicle spatial monitoring system 40 are preferably positioned within the vehicle 10 in relatively unobstructed positions to monitor a field of view the spatial environment. As employed herein, the spatial environment includes all external elements, including fixed objects such as signs, poles, trees, houses, stores, bridges, etc.; and, moving or moveable objects such as pedestrians and other vehicles. Each of these spatial sensors 41 provides an estimate of actual location or condition of an object, wherein said estimate includes an estimated position and standard deviation. As such, sensory detection and measurement of object locations and conditions are typically referred to as 'estimates'. It is further appreciated that the characteristics of these spatial sensors 41 are complementary, in that some are more reliable in estimating certain parameters than others. The spatial sensors 41 can have different operating ranges and angular coverages capable of estimating different parameters within their operating ranges. For example, radar sensors can usually estimate range, range rate and azimuth location of an object, but are not normally robust in estimating the extent of a detected object. A camera with vision processor is more robust in estimating a shape and azimuth position of the object, but is less efficient at estimating the range and range rate of an object. Scanning type lidar sensors perform efficiently and accurately with respect to estimating range, and azimuth position, but typically cannot estimate range rate, and are therefore not as accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, some of the spatial sensors 41 present parametric variances during operation, although overlapping coverage areas of the sensors create opportunities for sensor data fusion.

The HVAC system 44 is disposed to manage the ambient environment of the passenger compartment, including, e.g., temperature, humidity, air quality and the like, in response to operator commands that are communicated to the HVAC controller 144, which controls operation thereof. The HVAC controller 144 also includes an HVAC VHM agent 145.

The operator controls 46 can be included in the passenger compartment of the vehicle 10 and may include, by way of non-limiting examples, a steering wheel 108, an accelerator pedal, a brake pedal and an operator input device 110. The operator controls 46 and associated operator controller 146 enable a vehicle operator to interact with and direct operation of the vehicle 10 in functioning to provide passenger transportation. The operator controller 146 also includes an operator controller VHM agent 147. The operator control devices including the steering wheel 108, accelerator pedal, brake pedal, transmission range selector and the like may be omitted in some embodiments of the autonomous vehicle 10.

The steering wheel 108 can be mounted on a steering column 109 with the input device 110 mechanically mounted on the steering column 109 and configured to communicate with the operator controller 146. Alternatively, the input device 110 can be mechanically mounted proximate to the steering column 109 in a location that is convenient to the vehicle operator. The input device 110, shown herein as a stalk projecting from column 109, can include an interface device by which the vehicle operator may command vehicle operation in one or more autonomic control modes, e.g., by commanding activation of element(s)

of the autonomic vehicle control system 20. The mechanization of the input device 110 is illustrative. The input device 110 may be mechanized in one or more of a plurality of devices, or may be in the form of a controller that is voice-activated, or may be another suitable system. The input device 110 preferably has control features and a location that is used by present turn-signal activation systems. Alternatively, other input devices, such as levers, switches, buttons, and voice recognition input devices can be used in place of or in addition to the input device 110.

The HMI system 42 provides for human/machine interaction, for purposes of directing operation of an infotainment system, a GPS system, a navigation system and the like, and includes an HMI controller 142. The HMI controller 142 monitors operator requests and provides information to the operator including status of vehicle systems, service and maintenance information. The HMI controller 142 can also include a global positioning/navigation system. The HMI controller 142 communicates with and/or controls operation of a plurality of operator interface devices, wherein the operator interface devices are capable of transmitting a message associated with operation of one of the autonomic vehicle control systems. The HMI controller 142 preferably also communicates with one or more devices that monitor biometric data associated with the vehicle operator, including, e.g., eye gaze location, posture, and head position tracking, among others. The HMI controller 142 is depicted as a unitary device for ease of description, but may be configured as a plurality of controllers and associated sensing devices in an embodiment of the system described herein. The HMI controller 142 also includes an HMI VHM agent 143. Operator interface devices can include devices that are capable of transmitting a message urging operator action, and can include an electronic visual display module, e.g., a liquid crystal display (LCD) device, a heads-up display (HUD), an audio feedback device, a wearable device and a haptic seat. The operator interface devices that are capable of urging operator action are preferably controlled by or through the HMI controller 142. The HUD may project information that is reflected onto an interior side of a windshield of the vehicle, in the field of view of the operator, including transmitting a confidence level associated with operating one of the autonomic vehicle control systems. The HUD may also provide augmented reality information, such as lane location, vehicle path, directional and/or navigational information, and the like. HUD and related systems are understood by those skilled in the art.

The vehicle lighting, illumination and external signaling system 48 includes a plurality of headlamps, tail lamps, brake lamps, marker lamps, signal lamps, and the like, which are controllable via the lighting controller 148. The lighting controller 148 is in communication with ambient light sensors, the GPS system, and the navigation system, and executes control routines that selectively illuminate various ones of the headlamps, tail lamps, brake lamps, marker lamps, signal lamps based upon the ambient light, the direction of intended travel from the GPS and navigation systems, and other factors. Other factors may include an override command to illuminate the vehicle lamps in a construction zone. The lighting controller 148 also includes a lighting VHM agent 149.

In one embodiment, the vehicle 10 is configured to communicate with the communication network 285, including communicating between a controller associated with an intelligent highway system and the vehicle 10. An intelligent highway system can be configured to monitor locations, speeds and trajectories of a plurality of vehicles, with such information employed to facilitate control of one or a plurality of similarly-situated vehicles. This can include communicating geographic location, forward velocity and acceleration rate of one or more vehicles in relation to the vehicle 10. In one embodiment, the vehicle 10 is configured to communicate with an off-board controller 280 via the communication network 285.

The VHM controller 150 is configured to autonomously monitor health of various on-board subsystems that perform one or more functions related to autonomous vehicle operation. The VHM controller 150 includes a controller architecture that is configured with multilayer hierarchical VHM data processing, collection, and storage employing the plurality of VHM agents that are associated with a VHM master controller that can communicate with the off-board controller 280. This configuration can serve to reduce data processing complexity, data collection and data storage costs. The VHM controller 150 provides a centralized system monitoring and a distributed system monitoring arrangement with data collection via the VHM master controller and the plurality of VHM agents to provide a rapid response time and an integrated vehicle/system level coverage. The VHM controller 150 can also include a fault mitigation controller and a redundant VHM master controller to verify integrity of VHM information employed by the fault mitigation controller.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. The term 'model' refers to a processor-based or processor-executable code and associated calibration that simulates a physical existence of a device or a physical process. The terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form.

Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The terms "prognosis", "prognostics", and related terms are associated with data monitoring and algorithms and evaluations that render an advance indication of a likely future event associated with a component, a subsystem, or a system. Prognostics can include classifications that include a first state that indicates that the component, subsystem, or system is operating in accordance with its specification ("Green" or "G"), a second state that indicates deterioration in the operation of the component, subsystem, or system ("Yellow" or "Y"), and a third state that indicates a fault in the operation of the component, subsystem, or system ("Red" or "R"). The terms "diagnostics", "diagnosis" and related terms are associated with data monitoring and algorithms and evaluations that render an indication of presence or absence of a specific fault with a component, subsystem or system. The term "mitigation" and related terms are associated with operations, actions or control routine that operate to lessen the effect of a fault in a component, subsystem or system.

The telematics controller includes a wireless telematics communication system capable of extra-vehicle communications, including communicating with a communication network system 285 having wireless and wired communication capabilities. The telematics controller is capable of extra-vehicle communications that includes short-range vehicle-to-vehicle (V2V) communication. Alternatively or in addition, the telematics controller has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics controller, and the handheld device executes the extra-vehicle communication, including communicating with the off-board controller 280 via the communication network 285. Alternatively or in addition, the telematics controller executes the extra-vehicle communication directly by communicating with the off-board controller 280 via the communication network 285.

Prognostic classification routines to determine a prognostic, i.e., R/Y/G, for each of the subsystems can be executed in the VHM controller 150. The prognostic classification routines can detect occurrence of a Green prognostic associated with one of the vehicle subsystems and associated controllers of the autonomic vehicle control system 20, and the VHM controller 150 can block associated data transmission off board via the communication network 285 to reduce data communication load to the off-board controller 280. Alternatively, the transmission of a Green prognostic can be in the form of a simple acknowledgement of Green determination for a component, subsystem, or system of one of the vehicle systems and associated controllers of the autonomic vehicle control system 20 with a time stamp, thus minimizing the data transmission load to the off-board controller 280.

The VHM controller 150 includes executable routines that evaluate on-vehicle devices that monitor the spatial environment of the autonomous vehicle 10, including, e.g., the vehicle spatial monitoring system 40, spatial monitoring controller 140 and spatial monitoring VHM agent 141 that are described with reference to FIG. 1.

Figure 2:
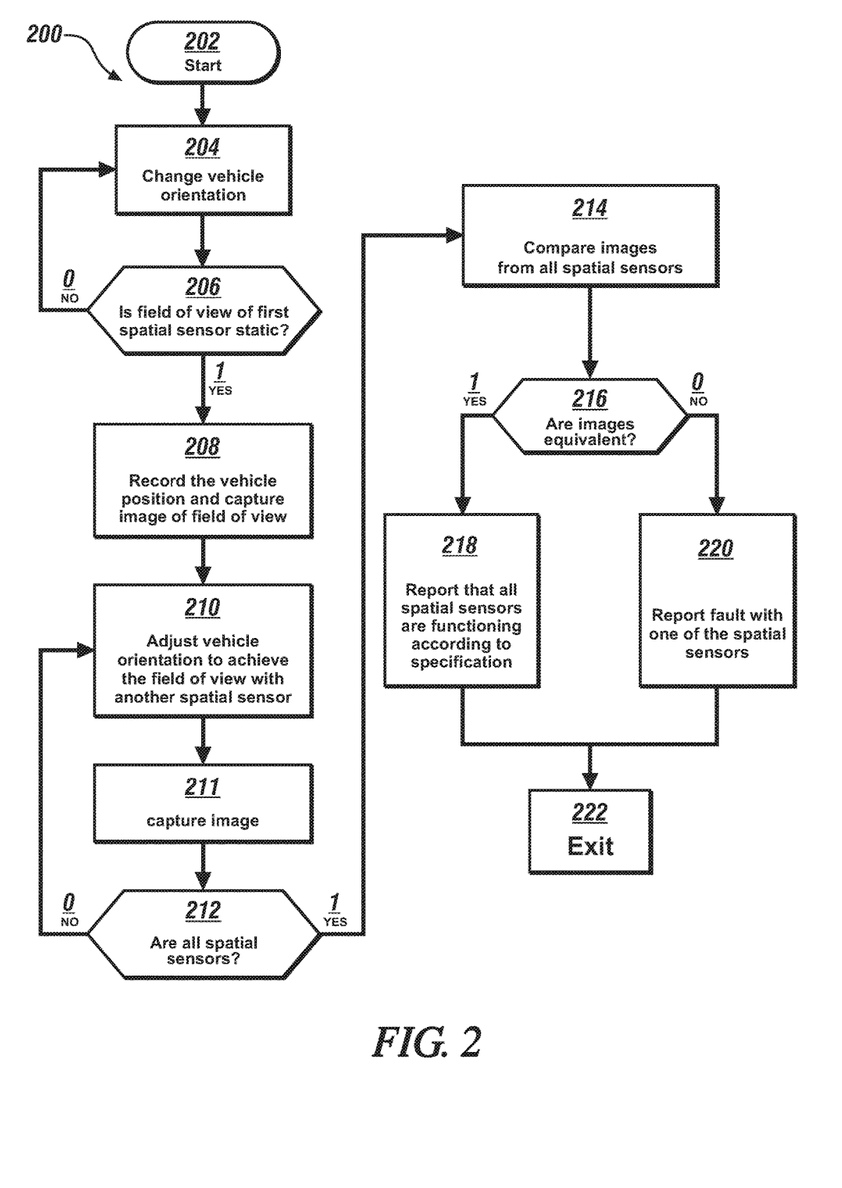
FIG. 2 schematically shows an embodiment of a static perception routine that is disposed to generate a perception result associated with a static field of view for each of a plurality of the on-vehicle spatial monitoring sensors in accordance with the disclosure.

As described herein, the VHM controller 150 can include a static perception routine 200 that is disposed to generate a perception result associated with a static field of view for each of a plurality of the spatial sensors 41 and compare the perception results to detect a fault associated therewith. The static perception routine 200 can be triggered to execute at any desired time, and is executed as a control routine stored in a memory device in one of the vehicle controllers.

FIG. 2 schematically shows an embodiment of the static perception routine 200. Table 1 is provided as a key wherein the numerically labeled blocks and the corresponding functions are set forth as follows, corresponding to the static perception routine 200. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
|---|---|
| 202 | Start |
| 204 | Change vehicle orientation |
| 206 | Is field of view of a first spatial sensor static? |
| 208 | Record vehicle position, and capture image of the field of view with first spatial sensor |
| 210 | Adjust vehicle orientation to achieve the field of view with another spatial sensor |
| 211 | Capture image |
| 212 | Are all spatial sensors tested? |
| 214 | Compare images from all the spatial sensors |
| 216 | Are images equivalent? |
| 218 | Report all spatial sensors are functioning according to specification |
| 220 | Report fault with one of the spatial sensors |
| 222 | End |

Execution of the static perception routine 200 may proceed as follows. The steps of the static perception routine 200 may be executed in a suitable order, and are not limited to the order described with reference to FIG. 2.

Upon initiation (202), orientation of the vehicle is changed (204) until a first of the spatial sensors 41 of the on-vehicle spatial monitoring system 40 has a static field of view (206)(0). When the field of view of the first spatial sensor is static (206)(1), the vehicle position is recorded and the first spatial sensor is operated to capture an image of the field of view (208). The orientation of the vehicle 10 is adjusted so that a second of the spatial sensors includes the static field of view (210) and the second spatial sensor is operated to capture an image of the static field of view (211).

This process is repeated until all of the spatial sensors have been tested (212)(0), i.e., have capture images of the static field of view (212)(1). This includes sequentially positioning the vehicle such that the spatial sensors of the on-vehicle spatial monitoring system 40 are each placed at an analogous orientation to generate the respective perception result associated with the previously identified static field of view.

The images of the static field of view from all of the spatial sensors are compared (214) to determine if they are similar or equivalent, wherein similarity and equivalence are determined based upon selected markers in the various images (216). When the images of the static field of view from all of the spatial sensors are similar (216)(1), a report is generated indicating that all the spatial sensors are functioning according to specification (218) and this iteration ends (222). When the images of the static field of view from one or more of the spatial sensors deviates from an expected image (216)(0), a report is generated indicating a fault with one or more of the spatial sensors, i.e., one or more of the spatial sensors is not functioning according to its specification (220) and this iteration ends (222). The reporting function of steps 218 and 220 includes reporting the result to the operator via the HMI controller 142 and one of the operator interface devices, and can also reporting the result to a service center, via the off-board controller 280 and the communication network 285. As such, each of the on-vehicle spatial monitoring sensors can be sequentially positioned at an analogous orientation to generate the respective perception result associated with the field of view.

Figure 3:
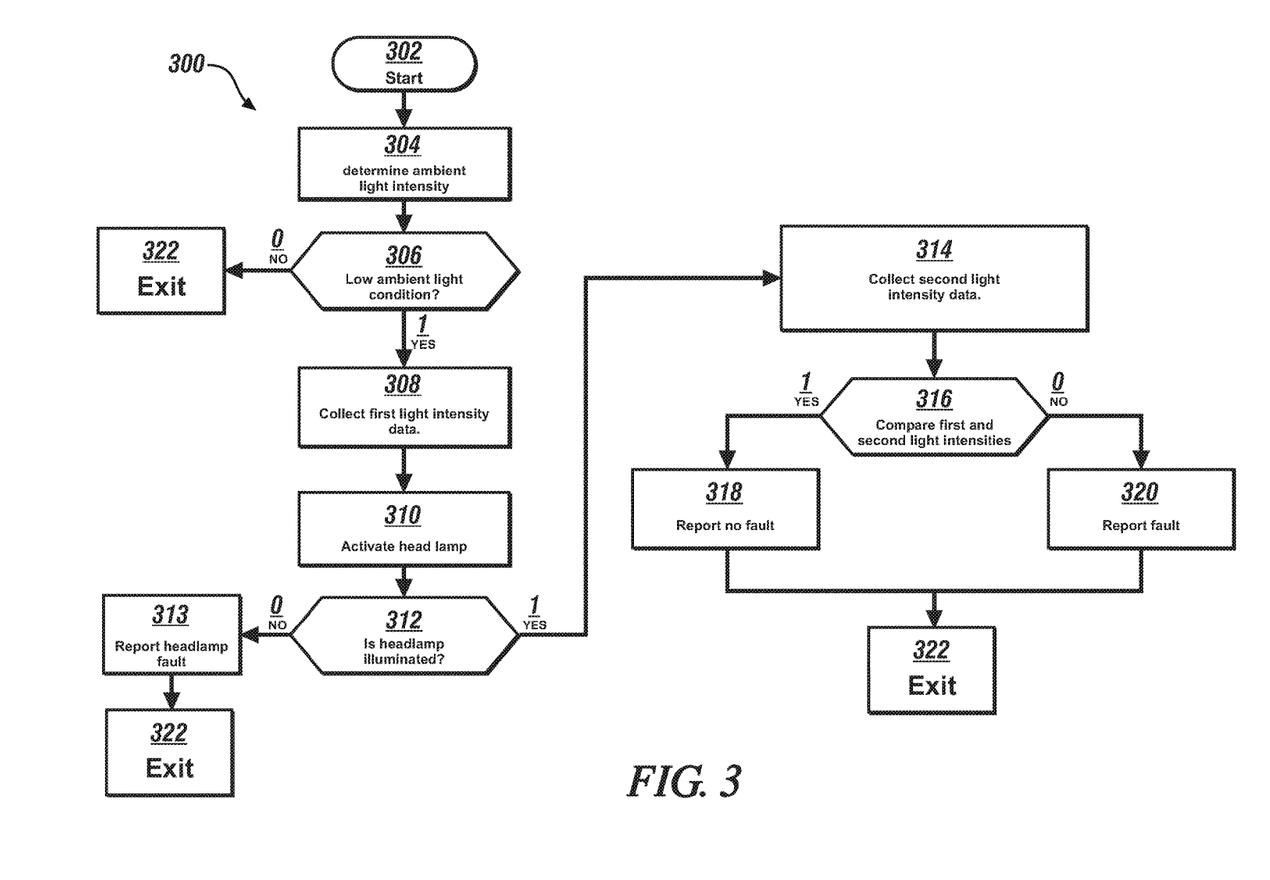
FIG. 3 schematically shows an embodiment of an ambient light perception routine that is disposed to generate a perception result for each of the plurality of the on-vehicle spatial monitoring sensors to detect a fault associated therewith, in accordance with the disclosure.

As described herein, the VHM controller 150 can include an ambient light perception routine 300 that is disposed to generate a perception result for each of the plurality of the on-vehicle spatial monitoring sensors to detect a fault associated therewith. The ambient light perception routine 300 can be triggered to execute under suitable conditions described herein, and is executed as a control routine and an associated database in a memory device in one of the vehicle controllers.

FIG. 3 schematically shows an embodiment of the ambient light perception routine 300. The ambient light perception routine 300 is executed to evaluate a capability of each of the on-vehicle spatial monitoring sensors. Table 2 is provided as a key wherein the numerically labeled blocks and the corresponding functions are set forth as follows, corresponding to the ambient light perception routine 300. The teachings may be described herein in terms of functional and/or logical block components and/or various processing steps. It should be realized that such block components may be composed of hardware, software, and/or firmware components that have been configured to perform the specified functions.

TABLE 2

| BLOCK | BLOCK CONTENTS |
| --- | --- |
| 302 | Start |
| 304 | Determine ambient light intensity |
| 306 | Is it a low ambient light condition? |
| 308 | Collect first light intensity data from the spatial sensor |
| 310 | Activate headlamp of vehicle |
| 312 | Is headlamp illuminated? |
| 313 | Report headlamp fault |
| 314 | Collect second light intensity data from the spatial sensor with headlamp illuminated |
| 316 | Compare first and second light intensities |
| 318 | Report no fault |

TABLE 2-continued

| BLOCK | BLOCK CONTENTS |
| --- | --- |
| 320 | Report spatial sensor fault |
| 322 | End |

Execution of the ambient light perception routine 300 may proceed as follows. The steps of the ambient light perception routine 300 may be executed in a suitable order, and are not limited to the order described with reference to FIG. 3. The ambient light perception routine 300 preferably executes when the vehicle is not operating, or when the vehicle is standing still.

Upon initiation (302), ambient light intensity is determined (304), which can include employing information from time of day and on-vehicle sensors, such as those sensors employed to activate headlamps. When then ambient light intensity is greater than a threshold intensity (306)(0), the routine ends without further action (322). When then ambient light intensity is less than the threshold intensity (306)(1), the routine confirms that the headlamps are deactivated, and a first light intensity datapoint is captured from one or more of the spatial sensors 41 of the on-vehicle spatial monitoring system 40 (308). One or both of the vehicle headlamps is activated (310), and the routine verifies whether the headlamp illuminates (312). This includes, e.g., monitoring electrical current to the headlamp to verify current draw that can be associated with illumination. When the headlamp fails to illuminate (312)(0), a headlamp fault is captured and reported (313) and this iteration ends (322). When the headlamp illuminates (312)(1), a second light intensity datapoint is captured and reported (314), and the first and second light intensity datapoints are compared to determine whether there is a difference in intensities that is greater than a threshold value (316). If the difference in intensities is greater than the threshold value (316)(1), the routine reports that there is no fault with the spatial sensor (318) and this iteration ends. If the difference in intensities is less than the threshold value (316)(0), the routine reports that there is a fault with the spatial sensor (318) and this iteration ends. The reporting function of steps 318 and 320 includes reporting the result to the operator via the HMI controller 142 and one of the operator interface devices, and can also reporting the result to a service center, via the off-board controller 280 and the communication network 285. Each of the spatial sensors can be tested simultaneously, or sequentially.

Figure 4:
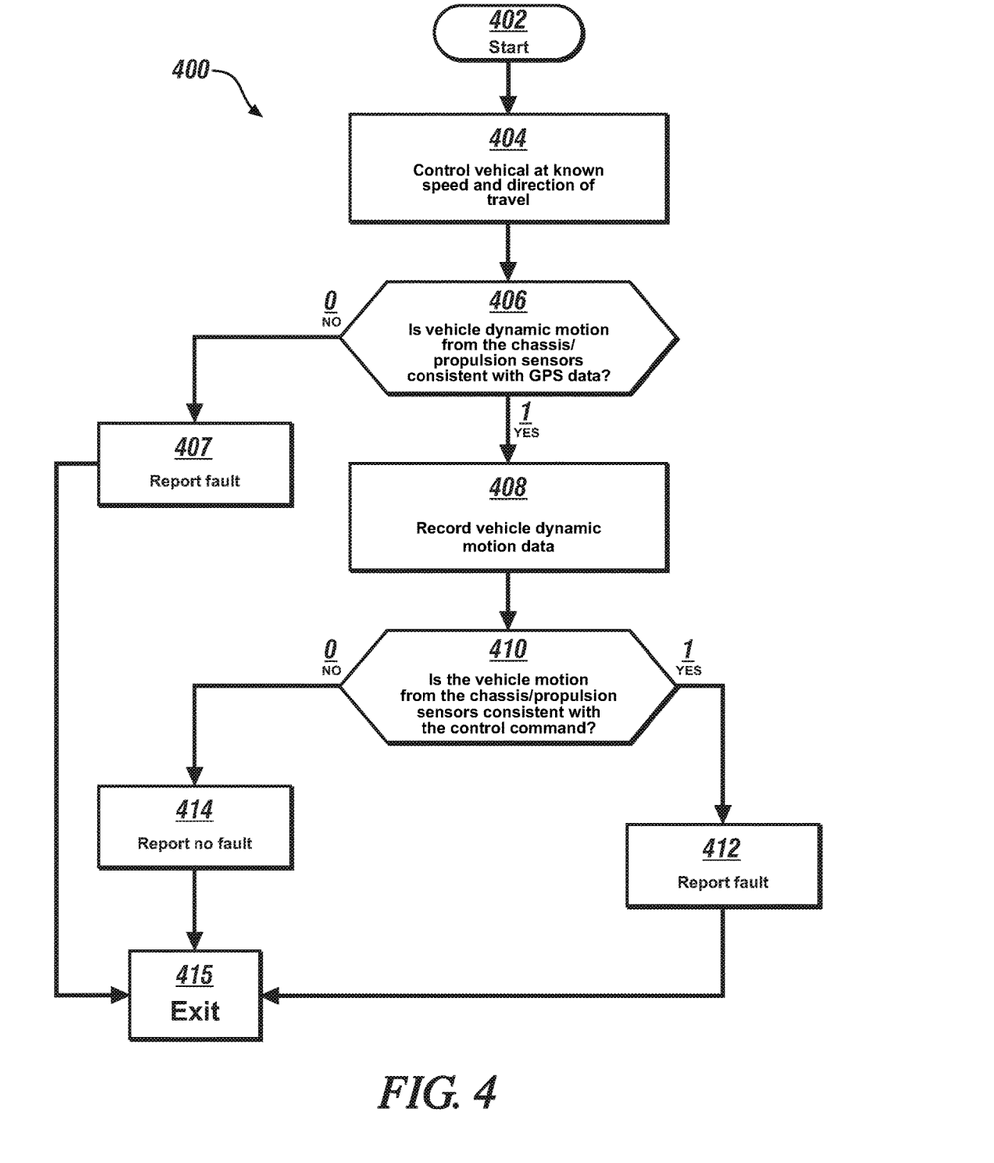
FIG. 4 schematically shows an embodiment of a vehicle dynamics perception routine that is disposed to generate a perception result for each of the spatial sensors of the on-vehicle spatial monitoring system to detect a fault associated therewith, in accordance with the disclosure.

As described herein, the VHM controller 150 can include a vehicle dynamics perception routine 400 that is disposed to generate a perception result for each of the spatial sensors 41 of the on-vehicle spatial monitoring system 40 to detect a fault associated therewith. The vehicle dynamics perception routine 400 can be triggered to execute under suitable conditions described herein, and is executed as a control routine and an associated database in a memory device in one of the vehicle controllers.

FIG. 4 schematically shows an embodiment of the vehicle dynamics perception routine 400. The vehicle dynamics perception routine 400 is also executed to evaluate each of the spatial sensors 41. Table 3 is provided as a key wherein the numerically labeled blocks and the corresponding functions are set forth as follows, corresponding to the vehicle dynamics perception routine 400. The teachings may be described herein in terms of functional and/or logical block components and/or various processing steps. It should be realized that such block components may be composed of hardware, software, and/or firmware components that have been configured to perform the specified functions.

TABLE 3

| BLOCK | BLOCK CONTENTS |
|---|---|
| 402 | Start |
| 404 | Control the vehicle at a known speed and direction of travel |
| 406 | Is vehicle dynamic motion indicated by chassis and propulsion sensors consistent with GPS data? |
| 407 | Report fault with information from chassis and/or propulsion sensors and GPS data |
| 408 | Record vehicle dynamic motion data from chassis and propulsion sensors, record data from plurality of spatial sensors |
| 410 | Is vehicle motion indicated by the plurality of spatial sensors consistent with vehicle control? |
| 412 | Report fault with spatial sensor |
| 414 | Report no fault with spatial sensor |
| 415 | End |

Execution of the vehicle dynamics perception routine 400 may proceed as follows. The steps of the vehicle dynamics perception routine 400 may be executed in a suitable order, and are not limited to the order described with reference to FIG. 4. The vehicle dynamics perception routine 400 preferably executes when the vehicle is operating.

Upon initiation (402), operation of the vehicle is controlled at a desired speed and direction of travel (404), and vehicle dynamics are monitored via on-vehicle dynamic sensors, e.g., chassis and propulsion sensors. The vehicle dynamics are also monitored via the GPS system, and the results are compared (406). The routine evaluates whether the vehicle dynamic motion as indicated by the chassis and propulsion sensors is consistent with GPS data, i.e., the monitored outputs of the vehicle dynamic sensors are valid. When the vehicle dynamic motion as indicated by the chassis and propulsion sensors is inconsistent with the GPS data (406)(0), the routine reports occurrence of a fault with the information from the chassis and/or propulsion sensors and the GPS data (407) and this iteration ends (415).

When the vehicle dynamic motion as indicated by the chassis and propulsion sensors is consistent with the GPS data (406)(1), the routine records vehicle dynamic motion data from the chassis and propulsion sensors and also records and evaluates data from the spatial sensors 41 of the on-vehicle spatial monitoring system 40 (408).

When the vehicle dynamic motion data from the chassis and propulsion sensors and the related control of the vehicle at the desired speed and direction of travel is consistent with data from the spatial sensors of the on-vehicle spatial monitoring system 40 (410)(1), the routine reports no fault with the spatial sensors of the on-vehicle spatial monitoring system 40 (414), and this iteration ends (415).

When the vehicle dynamic motion data from the chassis and propulsion sensors and the related control of the vehicle at the desired speed and direction of travel is inconsistent with data from the spatial sensors of the on-vehicle spatial monitoring system 40 (410)(0), the routine reports a fault with the spatial sensors of the on-vehicle spatial monitoring system 40 (412), and this iteration ends (415). The reporting function of steps 412 and 414 includes reporting the result to the operator via the HMI controller 142 and one of the operator interface devices, and can also reporting the result to a service center, via the off-board controller 280 and the communication network 285.

Figure 5:
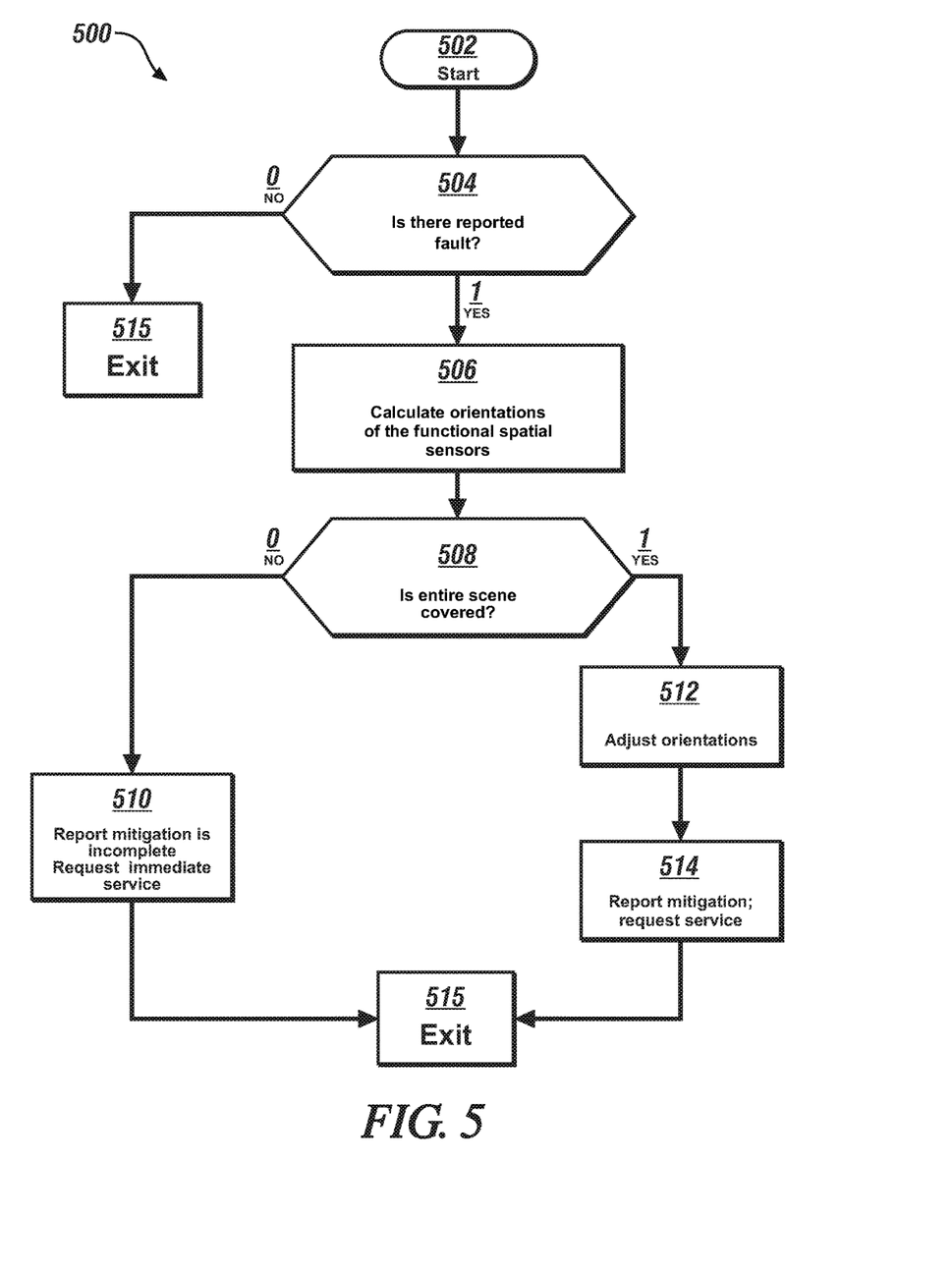
FIG. 5 schematically shows an embodiment of a fault mitigation routine that is disposed to mitigate operation when a fault related to one of the spatial sensors of the on-vehicle spatial monitoring system occurs, in accordance with the disclosure.

As described herein, the VHM controller 150 can include a fault mitigation routine 500 that is disposed to mitigate operation when a fault related to one of the spatial sensors 41 of the on-vehicle spatial monitoring system 40 occurs. The fault mitigation routine 500 can be triggered to execute upon detecting a fault, and is executed as a control routine and an associated database in a memory device in one of the vehicle controllers.

FIG. 5 schematically shows an embodiment of the fault mitigation routine 500. Table 4 is provided as a key wherein the numerically labeled blocks and the corresponding functions are set forth as follows, corresponding to the fault mitigation routine 500. The teachings may be described herein in terms of functional and/or logical block components and/or various processing steps. It should be realized that such block components may be composed of hardware, software, and/or firmware components that have been configured to perform the specified functions.

TABLE 4

| BLOCK | BLOCK CONTENTS |
|---|---|
| 502 | Start |
| 504 | Is there a reported fault with one of the spatial sensors? |
| 506 | Calculate orientations of the functional spatial sensors to cover entire scene |
| 508 | Is entire scene covered by fields of view of the functional spatial sensors? |
| 510 | Report that mitigation is incomplete; request immediate service |
| 512 | Adjust orientations of the functional spatial sensors to cover the entire scene |
| 514 | Report that mitigation is complete; request service |
| 515 | End |

Execution of the fault mitigation routine 500 may proceed as follows. The steps of the fault mitigation routine 500 may be executed in a suitable order, and are not limited to the order described with reference to FIG. 5. The fault mitigation routine 500 preferably executes when the vehicle is operating. Upon initiation (502), the routine determines whether there is a reported fault with one of the spatial sensors 41 of the on-vehicle spatial monitoring system 40 (504). When there is no reported fault (504)(0), this iteration ends (515). When there is a reported fault (504)(1), the routine calculates orientations of the functional spatial sensors to determine if they can cover entire an entire scene based upon their respective view angles and positions (506). When the entire scene can be covered by fields of view of the functional spatial sensors (508)(1), the orientations of the functional spatial sensors are adjusted to cover the entire scene (512), and the routine reports that the mitigation is complete, and service is requested (514). This iteration ends (515).

When the entire scene cannot be covered by fields of view of the functional spatial sensors (508)(0), the orientations of the functional spatial sensors are adjusted to cover the entire scene and the routine reports that the mitigation is incomplete, immediate service is requested (510), and this iteration ends (515). The reporting function of steps 510 and 514 includes reporting the result to the operator via the HMI controller 142 and one of the operator interface devices, and can also include reporting the result to a service center, via the off-board controller 280 and the communication network 285.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special-purpose hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for evaluating one of a plurality of spatial sensors disposed to monitor a spatial environment proximal to an autonomous vehicle, the method comprising:
    generating, via each of the plurality of spatial sensors, a perception result associated with a static field of view, wherein the spatial sensors are each positioned at an analogous orientation to generate the respective perception result associated with the static field of view, wherein each of the perception results represents a digital representation of the static field of view;
    comparing, via a controller, the perception results from the plurality of spatial sensors with an expected perception result for the static field of view;
    detecting a fault associated with one of the spatial sensors based upon the comparing of the perception results when the respective perception result from one of the spatial sensors deviates from the expected perception result for the static field of view; and then:
    generating a first perception result for one of the spatial sensors in an environment lacking in ambient light, wherein the first perception result includes a first light intensity;
    illuminating a headlamp of the autonomous vehicle and generating a second perception result for the one of the spatial sensors, wherein the second perception result includes a second light intensity;
    comparing the first and second light intensities;
    detecting a fault associated with the one of the spatial sensors when a difference between the first and second light intensities is less than a threshold; and
    reporting, via the controller, occurrence of the fault to a vehicle operator.

2. The method of claim 1, wherein the spatial sensors are sequentially positioned at the analogous orientation to generate the respective perception result associated with the static field of view.

3. The method of claim 1, wherein the autonomous vehicle includes vehicle dynamic sensors disposed to monitor a vehicle chassis and powertrain; the method further comprising:
    controlling the autonomous vehicle to execute a driving maneuver;
    monitoring vehicle dynamic motion data from the vehicle dynamic sensors and coincidently monitoring signal output from one of the spatial sensors;
    comparing the vehicle dynamic motion data from the vehicle dynamic sensors and the signal output from the one of the spatial sensors; and
    detecting a fault associated with the one of the spatial sensors when the vehicle dynamic motion data and the control of the autonomous vehicle to execute the driving maneuver are inconsistent with the signal output from the one of the spatial sensors.

4. The method of claim 3, further comprising:
    determining vehicle dynamic motion based upon the monitoring of the vehicle dynamic sensors and coincidently monitoring a GPS sensor on-vehicle;
    determining that the vehicle dynamic motion indicated the vehicle dynamic sensors is valid based upon the monitoring by the GPS sensor; and
    comparing the vehicle dynamic motion data from the vehicle dynamic sensors and the signal output from the one of the spatial sensor only when the vehicle dynamic motion indicated the vehicle dynamic sensors is valid.

5. The method of claim 1, further comprising:
    identifying the one of the spatial sensors having a fault associated therewith; and
    determining a field of view associated with the one of the spatial sensors having the fault; and
    adjusting the remaining ones of the spatial sensors to include the field of view associated with the one of the spatial sensors having the fault.

6. The method of claim 1, further comprising reporting the occurrence of the fault to a service center via the second controller and a communication network.

7. A method for evaluating one of a plurality of spatial sensors disposed to monitor a spatial environment proximal to an autonomous vehicle and a plurality of vehicle dynamic sensors disposed to monitor a vehicle chassis and powertrain of the autonomous vehicle, the method comprising:
    controlling, via a controller, the autonomous vehicle to execute a driving maneuver;
    monitoring vehicle dynamic motion data from the vehicle dynamic sensors and coincidently monitoring signal output from one of the spatial sensors;
    comparing the vehicle dynamic motion data from the vehicle dynamic sensors and the signal output from the one of the spatial sensors;
    detecting a fault associated with the one of the spatial sensors when the vehicle dynamic motion data and the control of the autonomous vehicle to execute the driving maneuver are inconsistent with the signal output from the one of the spatial sensors; and
    reporting, via the controller, occurrence of the fault.

8. The method of claim 7, further comprising:
    coincidently monitoring signal output from a GPS sensor on-vehicle;
    determining that the vehicle dynamic motion indicated the vehicle dynamic sensors is valid based upon the monitoring by the GPS sensor; and comparing the vehicle dynamic motion data and the signal output from the spatial sensor only when the vehicle dynamic motion indicated by the vehicle dynamic sensors is valid.

9. The method of claim 8, further comprising:
generating, via each of the plurality of spatial sensors, a perception result associated with a static field of view, wherein the spatial sensors are each positioned at an analogous orientation to generate the respective perception result associated with the static field of view;
comparing, via a controller, the perception results from the plurality of spatial sensors;
detecting a fault associated with one of the spatial sensors based upon the comparing of the perception results; and
reporting occurrence of the fault.

10. The method of claim 7, further comprising reporting the occurrence of the fault to a service center via the controller and a communication network.

11. An autonomous vehicle, comprising:
a vehicle spatial monitoring system including a plurality of spatial sensors disposed to monitor a spatial environment proximal to the autonomous vehicle;
a controllable headlamp;
a controller in communication with the spatial sensors of the vehicle spatial monitoring system and the controllable headlamp, the controller including a processor and a memory device, the memory device including an instruction set; the instruction set executable to:
generate, via each of the plurality of spatial sensors, a perception result associated with a static field of view, wherein the spatial sensors are each positioned at an analogous orientation to generate the respective perception result associated with the static field of view, and wherein each perception result represents a digital representation of the static field of view;
compare the perception results from the plurality of spatial sensors; and
detect a fault associated with one of the spatial sensors based upon the comparing of the perception results when the respective perception result from one of the spatial sensors deviates from the expected result for the static field of view; and then
generate a first perception result for one of the spatial sensors in an environment lacking in ambient light;
illuminate the headlamp and generate a second perception result for the one of the spatial sensors, wherein the first and second perception results are associated with light intensity;
compare the first perception result and the second perception result and
detect a fault associated with the one of the spatial sensors based upon the comparing of the first and second perception results.

12. The autonomous vehicle of claim 11, wherein the spatial sensors are sequentially positioned at the analogous orientation to generate the respective perception result associated with the static field of view.

13. The autonomous vehicle of claim 11, further comprising a plurality of vehicle dynamic sensors disposed to monitor a vehicle chassis and powertrain, wherein the instruction set is further executable to:
control the autonomous vehicle to execute a driving maneuver;
monitor vehicle dynamic motion data from the vehicle dynamic sensors and coincidently monitor signal output from one of the spatial sensors;
compare the vehicle dynamic motion data from the vehicle dynamic sensors and a signal output from the one of the spatial sensors; and
detect a fault associated with the one of the spatial sensors when the vehicle dynamic motion data and related control of the autonomous vehicle are inconsistent with the signal output from the one of the spatial sensors.

14. The autonomous vehicle of claim 11, wherein the instruction set is further executable to:
identify the one of the spatial sensors having a fault associated therewith; and
determine a field of view associated with the one of the spatial sensors having the fault; and
adjust positions of the remaining ones of the spatial sensors to include the field of view associated with the one of the spatial sensors having the fault.

15. The autonomous vehicle of claim 11, wherein the spatial sensor includes a camera.

16. The autonomous vehicle of claim 11, wherein the spatial sensor includes one of a radar device and a lidar device.

17. The autonomous vehicle of claim 11, further comprising the instruction set executable to report the occurrence of the fault to a vehicle operator via an on-board controller and report the occurrence of the fault to a service center via an on-vehicle controller and a communication network.

* * * * *